(12) United States Patent
Wyne

(10) Patent No.: US 6,502,771 B1
(45) Date of Patent: Jan. 7, 2003

(54) SPREADER/SPRAYER FOR LAWN MOWER APPARATUS

(76) Inventor: Mark W. Wyne, 2667 Christy Ave., Wildwood, MO (US) 63040

( * ) Notice: Subject to any disclaimer, the term of this patent is extended or adjusted under 35 U.S.C. 154(b) by 0 days.

(21) Appl. No.: 09/480,575

(22) Filed: Jan. 10, 2000

Related U.S. Application Data

(63) Continuation-in-part of application No. 09/175,043, filed on Oct. 19, 1998.
(60) Provisional application No. 60/061,895, filed on Oct. 14, 1997.

(51) Int. Cl.[7] .............................................. E01C 19/20
(52) U.S. Cl. ..................... 239/663; 239/650; 239/661; 239/664; 239/676; 239/172; 239/DIG. 6; 224/514; 224/521; 224/532
(58) Field of Search ................................. 239/650, 661, 239/663, 664, 676, 289, 172, 600, DIG. 6; 56/1, 14.7; 224/514, 515, 516, 521, 532, 401, 410

(56) References Cited

U.S. PATENT DOCUMENTS

| | | | |
|---|---|---|---|
| 3,082,007 A | * | 3/1963 | Johnson ...................... 222/610 |
| 3,523,648 A | | 8/1970 | Garber |
| 3,982,697 A | | 9/1976 | Maples |
| 4,063,748 A | * | 12/1977 | Schmidt ...................... 280/472 |
| 4,289,256 A | | 9/1981 | Bailey |
| 4,688,819 A | * | 8/1987 | Reilly et al. ................. 172/272 |
| 4,725,004 A | | 2/1988 | Baran, Jr. |
| 4,744,580 A | * | 5/1988 | Ryan ............................... 56/6 |
| 4,798,325 A | | 1/1989 | Block |
| 5,106,002 A | | 4/1992 | Smith et al. |
| 5,106,020 A | | 4/1992 | Harrell |
| 5,190,218 A | | 3/1993 | Kayser et al. |
| 5,195,308 A | | 3/1993 | Grote et al. |
| 5,237,803 A | | 8/1993 | Domingue, Jr. |
| 5,423,565 A | * | 6/1995 | Smith ........................... 172/313 |
| 5,533,676 A | | 7/1996 | Conley |
| 6,047,909 A | * | 4/2000 | Simpson ....................... 239/600 |

* cited by examiner

Primary Examiner—Robin O. Evans
(74) Attorney, Agent, or Firm—Paul M Denk

(57) ABSTRACT

Various instruments are provided to the structural chassis of a riding or standing mower, in order to accessorize various equipment that may be applied thereto, or readily removed, as required. These include tubular mounting brackets, that may secure, normally, permanently to the structural framework of the chassis, and accept the mounting thereto of the framework of any accessory, when installed in preparation for usage, or quickly removed, when no longer required. In addition, this invention provides mechanism for controlling the operations of the pivotal gate used in conjunction with, more specifically, a fertilizer spreader, and electrifies its functioning, so that the spreader can be initiated and applied through the application of a single ignition switch, which may be operated by the hand, or ever as a foot lever, to commence the operations of the spreader, or to immediately shut it off, as required by the operator.

9 Claims, 5 Drawing Sheets

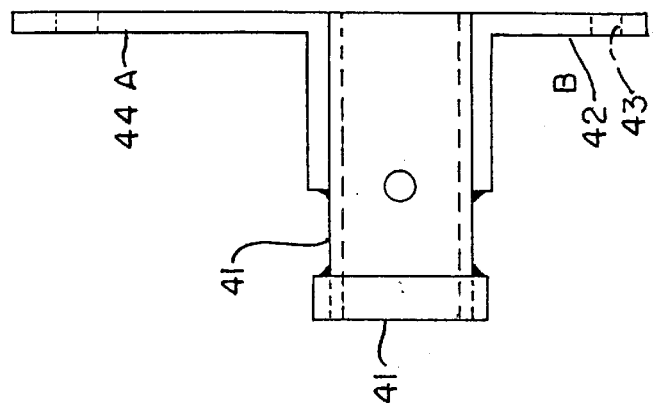
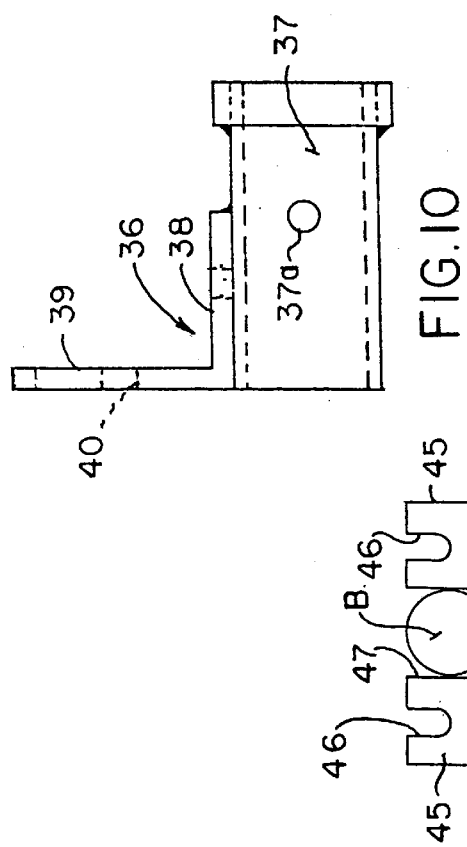
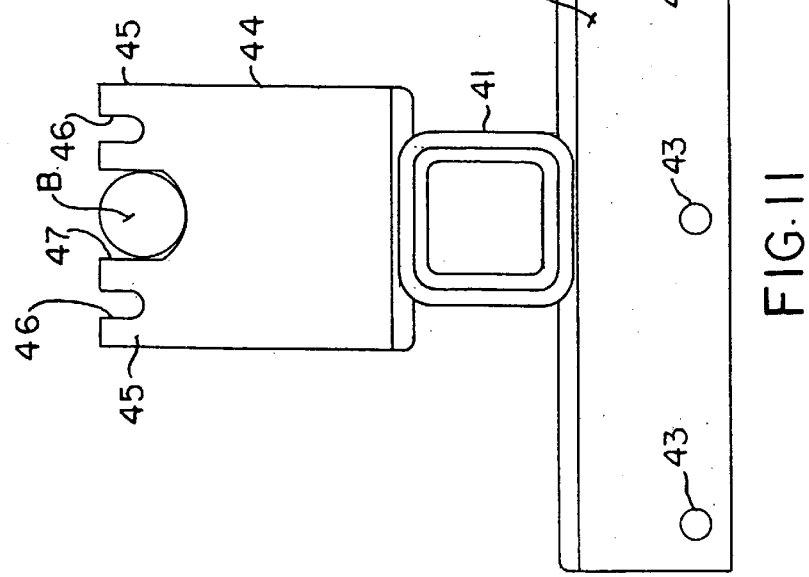

SPREADER/SPRAYER FOR LAWN MOWER APPARATUS

CROSS-REFERENCE TO RELATED APPLICATION

This application is a non-provisional patent application is a continuation-in-part of patent application having Ser. No. 09/175,043, filed on Oct. 19, 1998; which application was based upon provisional patent application having Ser. No. 60/061,895, filed on Oct. 14, 1997, all of which are owned by a common applicant.

BACKGROUND OF THE INVENTION

There are a variety of various styles of lawn mowers used both domestically, commercially, and for all facets of maintaining efficient lawn care, but predominantly, most of the more durable type of riding mower arrangements are employed by the commercial lawn care organizations, and may include further and additional accessories, in the nature of spreaders, sprayers, and the like, for use for facilitating complete lawn care during performance of such procedure. An example of apparatuses that may be utilized in conjunction with some type of a movable vehicle, such as a lawn mower, roller, or the like, and which includes accessories for facilitating the further treatment of the lawn, such as with the spraying of fertilizer, herbicide, or the like, can be seen in a variety of prior art patents. An example of such a patent is shown in the U.S. patent to Maples, U.S. Pat. No. 3,982,697, which is upon a spraying apparatus, per se, which is attached to and used in conjunction with a mowing apparatus, as can be seen.

The prior patent to Harrell, U.S. Pat. No. 5,106,020, discloses another form of spray attachment for lawn mowers. This particular sprayer attachment includes a spray rod, with a sprayer tip, and which is in fluid communication with its container that supplies the necessary fluid to the sprayer during usage.

The prior patent to Grote, et al, U.S. Pat. No. 5,195,308, shows a mower having fluid dispersion characteristics. In this particular instance, there is disclosed a grass cutting apparatus, in the form of a riding mower, and which has constructed into its various structural features a spraying apparatus terminating with a hand-held spraying wand, as can be noted.

Another patent disclosure that shows means for spraying a surface is shown in the prior patent to Domingue, Jr., U.S. Pat. No. 5,237,803, which shows a centrifugal combination sprayer/cutter apparatus. In this particular instance, it includes a sprayer means operatively associated with the under carriage of the cutting means, so that as it sprays a fluid downwardly, it may encounter the rotating cutting blades, and be disseminated during a lawn cutting performance.

The patent to Conley, U.S. Pat. No. 5,533,676, discloses a multi-purpose lawn care machine. This particular machine combines, at its frontal portion, a further wheeled accessory which includes a fertilizer storage bin, at its frontal portion, and a spray gun operatively associated therewith for providing for the spraying of the contained fluid.

Earlier prior art patents that disclosed prior developments as means for spreading fertilizer, or other components, onto the surface of the lawn, can be seen in the prior patent to Garber, U.S. Pat. No. 3,523,648, upon a broadcast spreader attachment for garden tractors.

The patent to Bailey, U.S. Pat. No. 4,289,256, discloses a tramlining device for a seed drill. This is a form of accessory, that is mounted to the towing bar of a tractor or similar other towing vehicle.

The patent to Baran, Jr., U.S. Pat. No. 4,725,004, shows another form of spray unit, mounted on the back end of the disclosed tractor chassis.

The patent to Block, U.S. Pat. No. 4,798,325, discloses a method and apparatus for applying liquid and dry lawn treatment materials, but in this particular instance, is mounted onto a wheeled vehicle that is pushed or motivated by a motor, with the worker walking therebehind.

The patent to Smith, et al, U.S. Pat. No. 5,106,002, shows a hitch mounted carrier assembly and method. This particular hitch is a tubular type of interconnection, for use, in this particular instance, as the attachment of a carrier assembly to the back end of the shown vehicle.

The patent to Kayser, et al, U.S. Pat. No. 5,190,218, shows another type of device for spraying liquids with a small tractor, wherein the liquid reservoir which may hold the fertilizer, or the like, and is attached on a carriage at the back end of the shown tractor.

Hence, the variety of prior art patents in existence, as can be reviewed from the foregoing summary, generally disclose some type of attachment of a accessory, in most instance a fertilizer sprayer, generally to the back end of some form of a riding vehicle, normally, a small tractor.

The current invention, on the other hand, provides an improved means for providing more portability to the attachment of such accessories, in this particular instance, primarily a spreader, as distinct from a sprayer, through the usage of a unique form of mounting bracket, that works quite effectively to allow for the accessories to be instantly connected thereto, or disengaged, in preparation for their usage, or removal. In addition, this invention provides means for the improved automatic operations of a spreader, once it has been installed, so that all the operator need to do, to initiate a spreading function, is simply to press a singular button, or other actuating means, to provide instantaneous functioning of the spreader, thereby allowing the operator to continue to control the tractor, and avoid any mishaps, or other problems, that may occur due to lack of attention.

SUMMARY OF THE INVENTION

The principle of this invention is to provide means for furnishing stable mounting of removable accessories to a lawn mower, whether it be of the riding type, or the walk behind type, so as to allow the lawn care worker to immediately place into operation the various accessories required during servicing of a lawn, or to remove the same from operation, without too much delay. In addition, the further principle of this invention improves upon the structure and functionality of a fertilizer or other granular material spreader, of the type that is used in conjunction with a tractor, or riding mower, or which may be built into the structure of the same, so as to allow the operator to simply initiate the operations of the spreader, once installed, through the actuation of a singular switch, either by hand or foot, that provides both an opening for dispensing by the spreader, for routine usage during spreading of such type of material, and then instantly causes reclosure, upon disengagement of its actuating switch.

This invention contemplates the structural improvement to the lawn care mower, whether it be of the riding type, the walk-behind type, or the more advanced style of mowers that include a zero turning radius, and which have become in vogue particularly in the lawn care business. Normally, such a mower has a spreader, and in many instances, a sprayer, attached to it, enabling the service man to both spray for weeds, and to apply lawn fertilization to the ground surface, simultaneously while mowing the lawn during the conduct of lawn care service. Usually, though, the service man will initially cut the lawn, and then go back over it to provide for either a spreading of the fertilizer, or spraying of the herbicide, followed by the spreading or spraying which has not already been performed previously. Essentially, though, the function of this invention is to provide for the allowance of the attachment of a sprayer, but more preferably a spreader, to the riding mower, as an accessory, as it is needed, so that these types of accessories may be applied to either the newly constructed mowers, or even those that have been in existence for some time, generally accessorizing these type of components, to complement all the needs of the service man, while fully treating and caring for a lawn.

Usually, these types of accessories, as for example, currently used with a zero turning radius type of riding mower, will include a sprayer, generally at the back end, and which includes a small tank, mounted thereto, powered by a battery, and which can dispense the liquid herbicide to the surface of the lawn, during its usage, and when required. In addition, a spreader, the type that will spread granular or pelletized type of fertilizer, to the surface of the lawn, can be applied through the current invention, once again, as an accessory, rather than an integrally built structure, that may be applied, as needed, to the riding mower, and functioned, as required. When the spreader is initiated, for usage, another feature of this invention is to add to the convenience of the worker, and provide for a one-switch actuation of the spreader, to initiate its opening, for dispensing of its fertilizer, and to sustain such during usage, until such time as the switch means is deactivated, thereby allowing for a close-off of the spreader, and a curtailing of its spreading of the fertilizer, simply through the efforts of the operator by depressing a single switch, at one time, to provide complete control thereof.

These are examples of the types of accessories that may be used in conjunction with the current invention, and which adds to their portability, providing for their mounting through a various style of bracket directly to the structure or chassis of the mower, but which can be promptly removed, when not required for usage. In addition, this invention further enhances the instantaneous and singular switch control of the operations of, preferably, the fertilizer spreader through simply depressing only a single switch, to attain complete operations of the spreader, and deactivating the switch, to curtail the same. These are the features that function as improvements to initially accessorize these types of components for use in conjunction with a mower, and at the same time, to allow for such accessory's quick functioning, simply through the manipulation, at one time, of a singular switch.

It is, therefore, the principal object of this invention to provide means for accessorizing various attachments to, for example, a zero turning radius mower, so that sprayers, but particularly fertilizer spreaders, may be attached to the mower, as required for usage.

Another object of this invention is to provide for the convenience of usage of accessories in conjunction with a riding mower, or other type of mower, that may complement and complete the various styles of accessories that may be needed by the lawn care specialist, all for use in conjunction with the singular mower that may be owned or employed by the service man, during servicing of a customer's lawn.

Another object of this invention is to provide for an attachment means, or mounting bracket, that may allow for the very quick and prompt attachment of such accessories to the mower, in preparation for usage, or its removal, when no longer required.

Still another object of this invention is to reduce and minimize the effort that must be employed by the service man, while utilizing such a mower, allowing him/her to simply initiate the operations of, for example, a fertilizer spreader, first by depressing or actuating a singular switch.

These and other objects may become apparent to those skilled in the art upon reviewing the summary of the invention as provided herein, and upon undertaking a study of the description of its preferred embodiment, in light of the drawings.

BRIEF DESCRIPTION OF THE DRAWINGS

In referring to the drawings,

FIG. 10 is a side view of a modified tubular bracket for mounting a removable accessory to the mower;

FIG. 11 is a front view of a further modified tubular bracket for mounting a removable accessory to a mower; and FIG. 12 is a side view of FIG. 10.

DESCRIPTION OF THE PREFERRED EMBODIMENT

Figure 1:
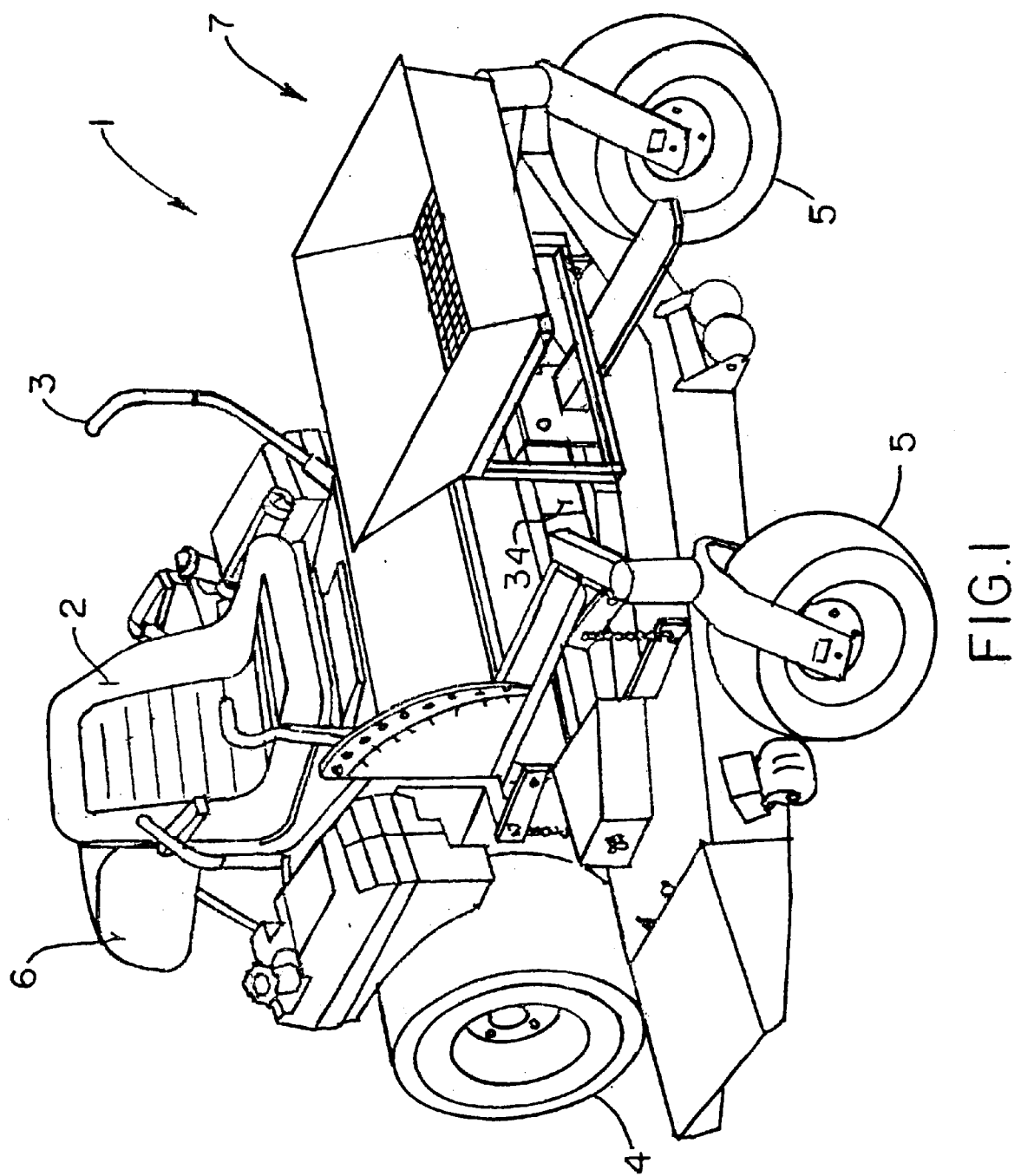
FIG. 1 provides a perspective view of a typical zero turning radius mower showing the attachment of the fertilizer spreader accessory to its front end, and a liquid sprayer device at its back end.

In referring to the drawings, and in particular FIG. 1, therein is shown what is normally known in the trade as a zero turning radius riding mower 1, having its usual seat arrangement 2, with control mechanisms 3, and supported for movability upon its wheels 4, and directional wheels 5. In this particular embodiment, and to accentuate the improvements of this invention, there may be mounted to the back of the mower a liquid sprayer 6, which may be used for spraying a herbicide, or the like, to the surface of the lawn, when operated. At the front of the mower is mounted the shown fertilizer spreader, as at 7, and which is used for the application of normally the granular style of fertilizer to the surface of the lawn, when that particular function is performed. Se also FIG. 2.

In this particular invention there are a number improvements that have been made to the structure of this overall development, and generally, as previously summarized, the initial improvement is the accessorizing of some of these various components that may be removably applied to the mower, whether it be a riding mower or stand-behind mower, so that such accessories, after being added to the vehicle, and used, can be readily removed after usage, or easily installed, when needed. Secondly, and as previously also summarized, it is the usage of various types of modifications to brackets, that allow for the accessorizing of these components, facilitating the prompt addition or removal of such spreaders or sprayers to the mower, during usage. As previously stated, in most instances, previous types of spreaders or sprayers were permanently mounted to such vehicles, and had to be maintained, in usage, and could not be removed, under any circumstances.

Figure 2:
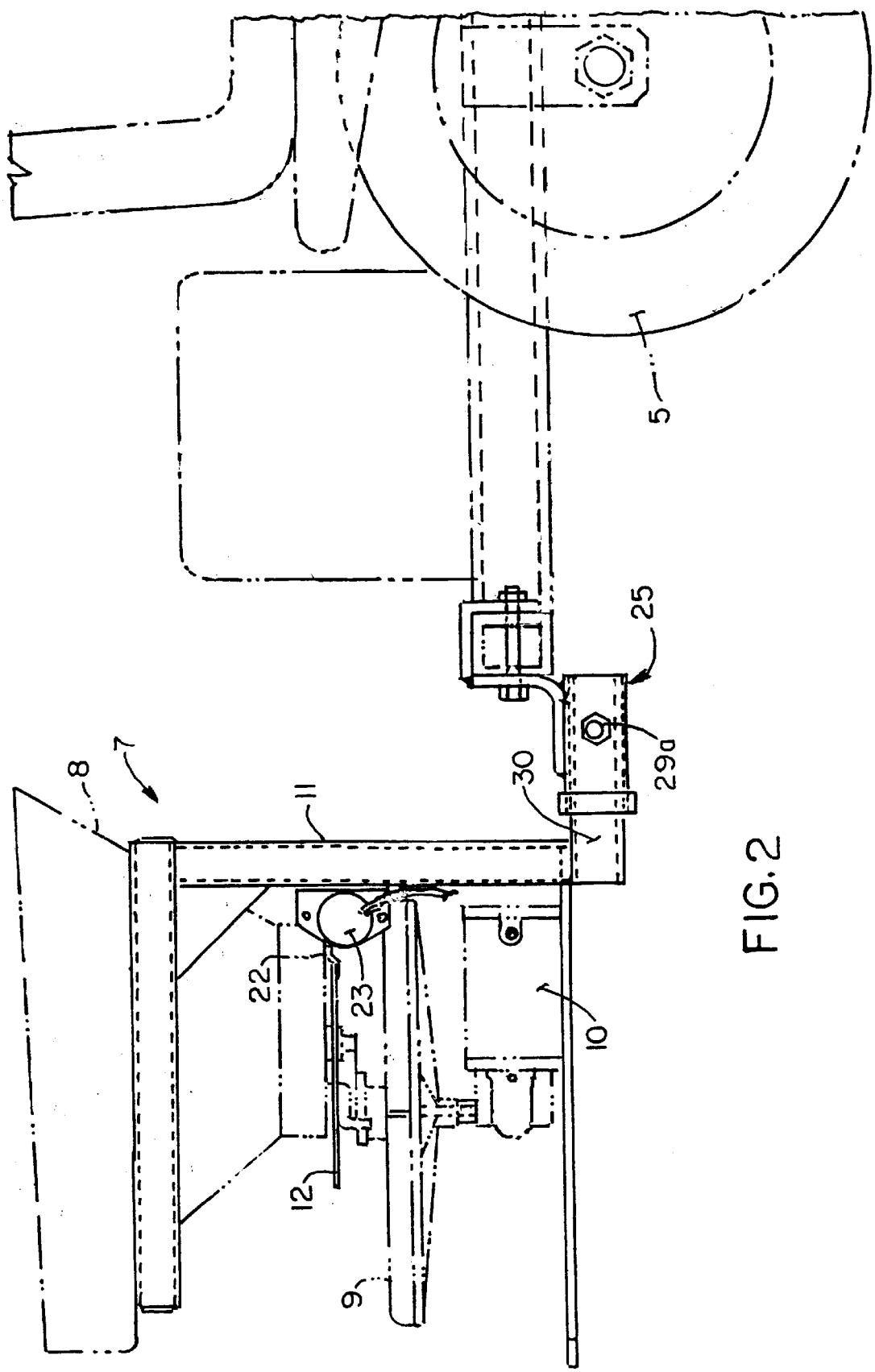
FIG. 2 is a side view of the fertilizer spreader improved with the enhanced components of this invention.
Figure 3:
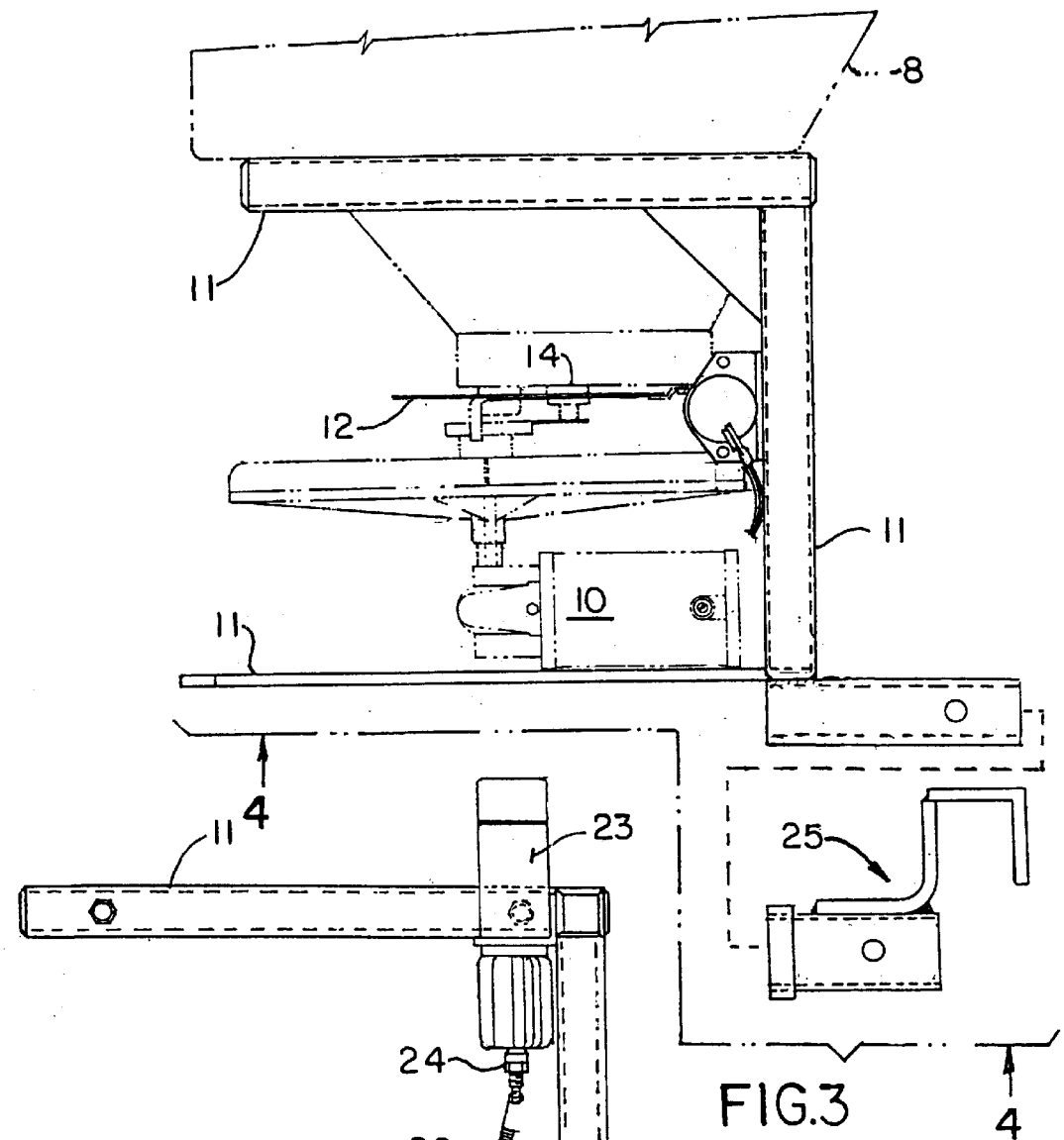
FIG. 3 is a side view of the fertilizer spreader.
Figure 4:
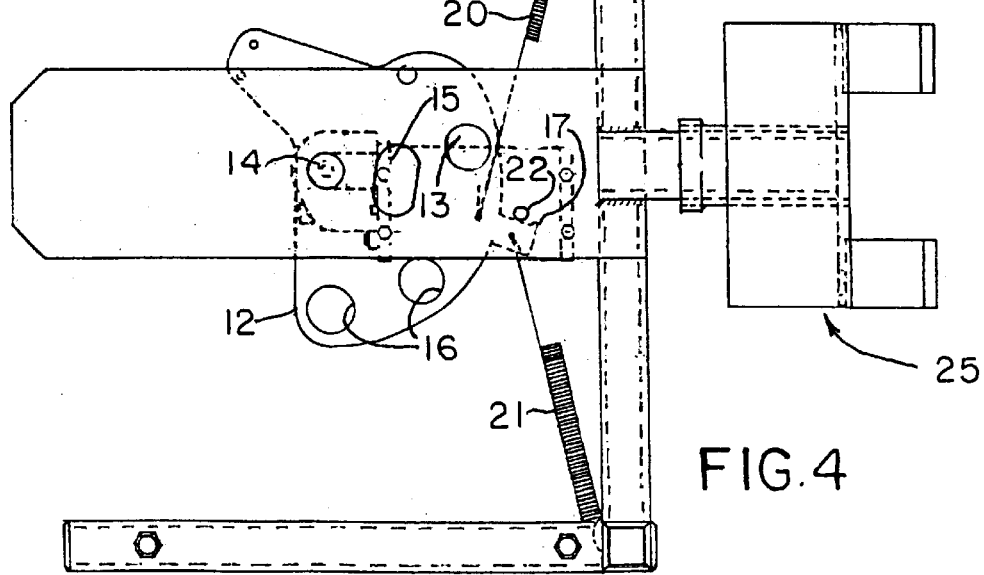
FIG. 4 is a plan sectional view of the gate for use for controlling the spreading of granular fertilizer, taken along the line 4—4 of FIG. 3.
Figure 6:
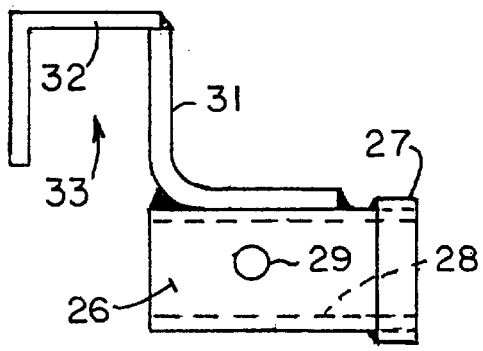
FIG. 6 is a side view of a tubular bracket for connecting with the frame of the mower and for mounting of removable accessories to the same.

In this particular invention, the means for facilitating the operations of the fertilizer spreader can be seen in FIGS. 2 through 4. Generally, the concept of this improvement is to provide for a single and prompt control to the spreader, to allow for its opening, performing a fertilizing spreading function, all through the initiation of a singular switch, battery operated, and readily available at the convenience of the operator, as upon the control panel, or available for foot actuation, as may be required. As can be seen in FIG. 2, the spreader mechanism itself includes a hopper 8, having the spreader blades 9 arranged directly therebelow, and which are operated by its motor 10, when energized, to allow for a spreading and scattering of the fertilizing seed as it descends by gravity from the shown hopper. Various types of support brackets 11 are included for structurally supporting both the hopper, and its motor mechanism, during usage. The improvement of this invention is the application of a control gate 12 to the underside of the hopper, and which gate, as can be seen in FIG. 4, includes a series of apertures, which have the following functionality. Initially, the aperture 13 of this improvement provides a means for furnishing a pivot point, to the gate, by pivotally connecting to a mount 14 that extends from the underside of the shown hopper. In addition, a clearance slot 15 is provided generally centrally of the shown gate, and this slot provides for the insertion of the agitator, normally associated with the spreader, therethrough, so that the agitator can transmit vibrations to the hopper, to assure that the granular or seedlike fertilizer is constantly descending, for uniform broadcasting and spreading by this instrument. In addition, the apertures 16 are furnished for aligning, with similar arranged apertures provided in the bottom of the hopper 8, when the control gate is pivoted, into an operating position, so that with the alignment of these apertures 16 with the openings at the bottom of the hopper, fertilizer is allowed to free fall therethrough, for dispensing onto the spreader 9, to broadcast the granular material.

There is also an integral tab 17, and which functions to provide the arrangement of various apertures, as at 18 and 19, and to which the various control biasing'springs 20 and 21, respectively mount, for holding the control gate either in an open, or closed position, either when activated, or deactivated. In addition, the tab 17 cooperates with a stop 22 that is operatively associated with the bottom of the hopper 8, and which is positioned for being encountered by the tab 17, that allows for the proper alignment of the apertures 16, with the dispensing holes provided at the bottom of the hopper 8, when the control gate has been initiated into an opened position. This assures always that proper alignment of these apertures are made, to allow for maximum dispensing, as desired, and required. In addition, the stop 22 may be adjustable on the bottom of the hopper, so as to provide for either full or fractional alignment of the apertures 16, with the discharge ports or holes provided at the bottom of the hopper, so as to control the rate of dispensing of the granular fertilizer, during usage of this spreader.

A feature of this invention is the usage of a solenoid, as at 23, and which includes a solenoid shaft 24 extending from one end. The solenoid is mounted to the framework of the spreader 11. The relative strength of these two resilient springs 20 and 21 may be described as follows: Spring 21 normally has greater resilient strength than the spring 20. Usually, in the preferred embodiment, the spring 21 may be formed of stainless steel, and have a relative pull strength, as a tension spring, in the vicinity of ten pounds, more or less. The spring 20, in the preferred embodiment, is fabricated also as a stainless steel spring, but it has a lesser resilient strength, as a tension spring, and may have a pull strength of approximately five pounds, in comparison to the spring 21. Thus, when the solenoid 23 is deactivated, and its solenoid lever 24 is extended, the pull of the spring 21, which is of greater strength than the relaxed solenoid 23, pivots the control gate 12, into a clockwise direction, and disaligns its apertures 16, so that no discharge or spreading of fertilizer occurs. On the other hand, when the solenoid 23 is actuated, and retracts its solenoid lever 24, the constant pressure of the tension spring 20 and the solenoid, allows the spring 20 to function, to pivot the control gate counterclockwise, and which provides for alignment of the shown apertures 16, with the fertilizer dispensing ports, as previously described, provided at the bottom of the hopper 8, so as to allow for the discharge of the granular fertilizer. When this occurs, the degree to which the control gate 12 pivots, will be determined by the tab 17 encountering the adjusted stop 22, depending upon where the stop 22 has been adjusted to, and set at the bottom of the hopper 8, in preparation for usage of the fertilizer spreader.

It is feasible that the solenoid lever 24 may either connect directly to the tab 17, or through a linkage (not shown), such that when the solenoid retracts, when actuated, will provide for a pivot of the plate 12, and an opening of its discharge apertures, allowing for spreading of the granular fertilizer. And, when the solenoid is deactivated, allowing its lever 24 to extend, this will rotate the control gate 12 into a position where its apertures 16 are unaligned with the discharge ports at the bottom of the hopper 8, and thereby curtailing any further dispensing of the fertilizer material. This is just an example as to how other means may be used in lieu of springs, for providing a direct control to the pivot of the gate 12, during usage, and nonusage, of the fertilizer spreader.

Another feature of this invention is the unique mounting means that are provided in combination with the chassis of the mower, as previously reviewed, and which allows for the accessorizing of these various instruments that may be applied to the mower, such as the fertilizer spreader previously described herein.

Figure 7:
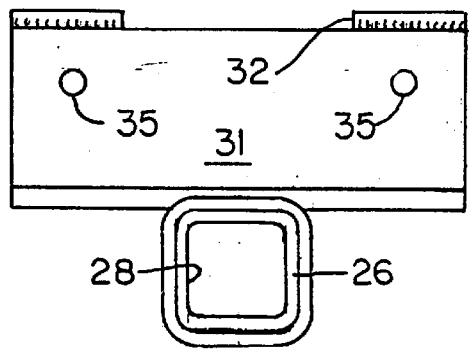
FIG. 7 is a front view thereof.
Figure 8:
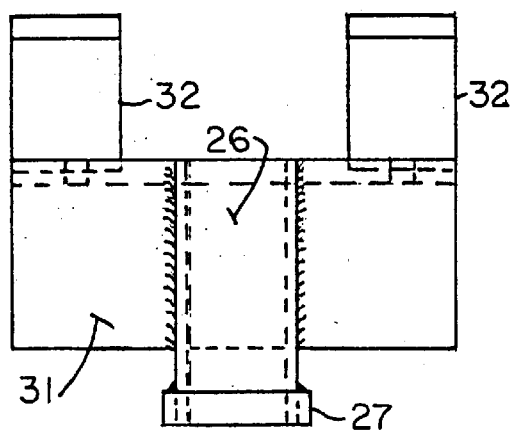
FIG. 8 is a bottom view thereof.
Figure 9:
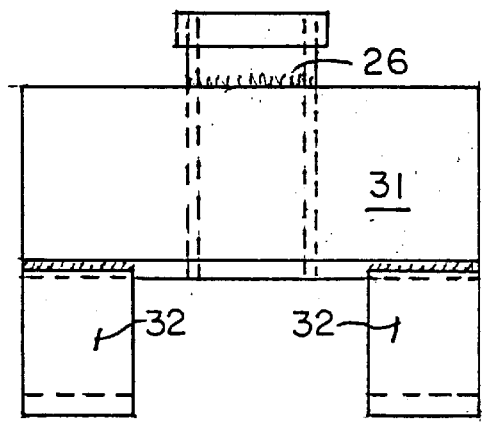
FIG. 9 is a top view thereof.
Figure 5:
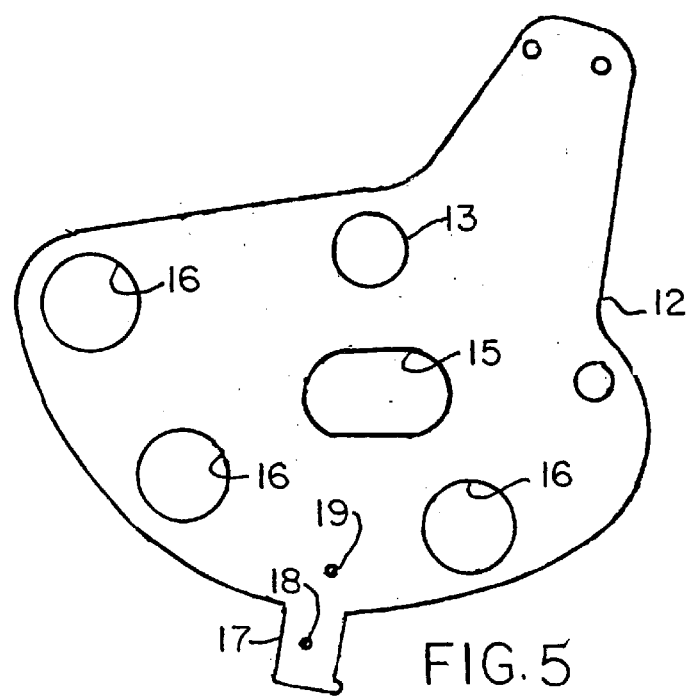
FIG. 5 is a plan view of the control gate, per se, used in conjunction with the spreader.

The bracket mount of this invention generally is shown in FIGS. 2 and 3, as at 25, for use for prompt mounting the disclosed spreader in place, onto the framework or chassis of the shown mower. More specifically, the mount, and its various structural components, are disclosed in FIGS. 6 through 9. As can be seen, in this particular embodiment, it includes a tubular mount 26, which may have a reinforcing rim 27, at its front end, and includes a central axial opening 28 therethrough. A pin hole 29 is provided and through which a fastening pin 29a may insert, after the tubular extension 30 of the spreader bracket 11, inserts therein, such that when the apertures of the tubular portion 30, aligned with the aperture 29, of the tubular mount, the pin 29a, may insert therethrough, for temporarily holding the spreader mounted as a removable accessory to the mower. See FIG. 2. The tubular mount 26 has secured thereto, as upon its upper surface, angles 31, which extends for some width, as can be seen in FIGS. 7 through 9, and the angle 31 includes further angles 32, secured thereto, as by welding. The spacing, as at 33, formed intermediate the angles 31 and 32, are designed for mounting onto the front beam, as can be seen at 34 in FIG. 1, to provide for the means for furnishing this style of mounting bracket for removably accessorizing various components, such as a spreader, that may be attached onto, or removed from, the mower, during usage, or when no longer needed. Further apertures may be provided, as at 35, through the angle 31, so as to allow for the insertion of a mounting bolt, or perhaps another securement pin, for holding the shown mounting bracket 25, in place, when installed upon the aforesaid mower chassis beam 34, as explained.

FIG. 10 shows another form of mounting bracket 36, that may secure to the chassis, or one of its beams, of a riding or other form of mower, and this particular mounting bracket includes its tubular mount 37, constructed similarly to the previously described tube 26, but in this particular instance, it has a securing angle 38 secured to its upper surface, either by welding, or by other fastener, such as a bolt. The upwardly extending leg 39 of this particular bracket also includes an aperture therethrough, as at 40, and which may support a fastener, such as a bolt, for securement of this tubular mount to the generally horizontal beam of the chassis of the mower, similar to that as previously described for the beam 34. As can be understood, once again, the tubular sleeve, such as 30, as previously reviewed in FIG. 2, will slide interiorly of the tubular mount 37, and be secured in place, when the removable accessory is applied to the mower, in preparation for its usage, as by the insertion of a pin or the like through the aperture 37a.

A further modification to the tubular mounting bracket of this invention can also be seen in FIGS. 11 and 12. In this particular instance, the mounting tube as shown, as at 41, is similar to the mounting tubes as previously explained, and which is designed for accepting and holding the tubular sleeve 30, of the accessorized component. This particular mounting bracket may be used with a further style of mower, having structural framework provided at the front of its chassis, and which affords structure of greater height that may be used for mounting an accessory of this type, such as the fertilizer spreader, or herbicide sprayer, through the use of the tubular mounting bracket, of the type as explained herein. In this particular instance, a lower angle, as at 42, is welded or otherwise secured to the bottom of the tubular mount 41, and this particular angle, and its downwardly depending leg, includes one or more apertures, as at 43, that may secure by fasteners, such as a bolt or pin, to the cross bracing or bracket provided at the front of the mower chassis. A further angle 44 secures, as by welding, to the top of the mounting tube 41, and it includes a pair of upwardly extending slotted flanges, as at 45, and which are designed for allowing the insertion of bolts, into their integral slots 46, for furnishing securement at the top of the tubular mount, to the mower chassis, during its installation. As can be noted, a further integral slot 47 is furnished approximately and upwardly centrally of the upper angle 44, to allow clearance for the locating of the pivot bolt B, as noted, which is normally provided in one embodiment of riding mower, and which functions to facilitate the steerage and alignment of the mower during usage.

These are all examples of the style of tubular mounts that may be used in conjunction with the various style of riding or other forms of mowers that are currently in existence, and which are designed for achieving the essence of this invention, and that is to accessorize these type of components, such as a spreader or sprayer, so that they may be immediately applied for usage, or removed, when not required.

Variations or modifications to the subject matter of this invention may occur to those skilled in the art upon reviewing the invention as described herein. Such variations or modifications, if within the spirit of this invention, as described herein, are intended to be encompassed within the scope of any claims provided in this disclosure. The description of the preferred embodiment, and as shown in the drawings, is set forth for illustrative purposes only.

Having thus described the invention, what is claimed and desired to be secured by Letters Patent is:

1. In a cutting mower of the type that provides for the accommodation of a driver, and having an accessory connected thereto, said cutting mower including various wheels to provide for its-motorized movement, and having a cutter blade therein for the trimming of grass, said cutting mower having a chassis and framework in its structure, the improvement comprising, a bracket fixably connected to the structure of the chassis of the cutting mower at one of its front and back locations, said bracket including a tubular mount, an angle means connecting to the tubular mount, and further connecting onto the structure of the cutting mower chassis, said tubular mount being permanently secured onto the said mower structure, said accessory incorporating a tubular portion capable of being aligned within the tubular mount of the bracket, fastening means cooperating between the tubular mount and the tubular portion to provide for their temporary interconnection together when the tubular portion has been slidingly inserted into the tubular mount of the bracket, to provide for a removable attachment of the accessory to the cutting mower for application, a fertilizer spreader connecting with the mount, said fertilizer spreader including a hopper for holding a supply of granular fertilizer, a spreader blade provided below the hopper and furnishing a dissemination of the granular fertilizer as it is dispensed from the hopper, said hopper having at least one discharge aperture provided at its bottom for dispensing of the granular fertilizer, a control gate provided intermediate the bottom of the hopper and the spreader blade, said control gate having at least one aperture therein which when aligned with the at least one aperture provided at the bottom of the hopper furnishes a discharge of the granular material, and upon pivot of the control gate and disalignment of the apertures, curtailing the further dissemination of the granular material, solenoid means connecting with the framework of the spreader, said solenoid means being operatively connected with the control gate, and upon actuation of the solenoid means, providing for an alignment of the at least one control gate aperture with the discharge aperture at the bottom of the hopper, thereby furnishing a spreading of the granular material, and said solenoid means, when de-energized, furnishing an unalignment of said apertures, and curtailing further spreading of the granular material.

2. The cutting mower of claim 1 and including a pair of biasing springs connecting to the control gate, one of said springs attaching with the hopper framework, and normally maintaining closure between the control gate and the at least one hopper aperture, to prevent discharge of granular material, and the second spring interconnecting between the control gate, and the solenoid means, such that when the solenoid means is energized, provides for a pivot to the control gate and alignment of its aperture with the hopper aperture to provide for spreading of the granular material.

3. The cutting mower of claim 2 hand wherein said control gate includes an extending flange, and at least one of said biasing springs interconnecting with said extending flange.

4. The cutting mower of claim 3 and including a stop means operatively associated with the framework of the fertilizer spreader, and said stop means being adjustable to provide for control of the amount of granular material dispensed through the control gate during its pivoting and alignment with the hopper discharge aperture upon energization of the solenoid means.

5. In a cutting mower of the type that provides for the accommodation of its driver, and having a mower accessory connected thereto, said mower including various wheels to provide for its motorized movement as a riding mower, and having a cutter blade therein for the trimming of grass, said cutting mower having a chassis and framework in its structure, the improvement comprising, a bracket fixably connected to the framework of the riding mower at one of its front and back locations, said bracket including a tubular mount, an angle means connecting to the tubular mount, and further connecting to the structure of the mower framework, said bracket being permanently secured onto the said mower framework, said accessory incorporating a tubular portion capable of being aligned within the tubular mount of the bracket, a reinforcing rim securing to one end of the tubular mount to provide for structural reinforcement of the tubular mount during reception of the tubular portion of the attached accessory, fastening means cooperating between the tubular mount and the tubular portion to provide for their temporary interconnection together, when the tubular portion has been slidingly inserted into the tubular mount of said bracket, in order to provide for a removable attachment of the accessory to the lawn mower for operation.

6. The cutting mower with bracket of claim 5 wherein said angle means having an upper end and includes an angle fixably attached to the angle means upper end, and provided for resting upon and embracing the mower framework to facilitate the permanent mounting of the tubular mount of the bracket thereto.

7. The cutting mower with bracket of claim 6 wherein there are two angles secured to the upper end of said angle means.

8. The cutting mower with bracket of claim 5 and including said angle means attached to the upper surface of the tubular mount, said angle means having first and second legs, the first leg of said angle means connecting to the tubular mount, the second leg of the angle means extending upwardly and disposed for permanent mounting to the framework of the cutting mower.

9. In a cutting mower of the type that provides for the accommodation of its driver, and having a mower accessory connected thereto, said mower including various wheels to provide for its motorized movement as a riding mower, and having a cutter blade therein for trimming of grass, said cutting mower having a chassis and framework in its structure, the improvement comprising, a bracket fixably connected to the framework of the riding mower at one of its front and back locations, said bracket including a tubular mount, an angle means connecting to the tubular mount, and further connecting to the structure of the mower framework, said bracket being permanently secured onto the said mower framework, said accessory incorporating a tubular portion capable of being aligned within the tubular mount of the bracket, fastening means cooperating between the tubular mount and the tubular portion to provide for their temporary interconnection together, when the tubular portion has been slidingly inserted into the tubular mount of said bracket, in order to provide for a removable attachment of the accessory to the cutting mower for operation, said bracket including a lower angle securing to the bottom of the tubular mount, said lower angle disposed for attachment permanently to the framework of the cutting mower, an angle means securing to the top of the tubular mount, and said angle means disposed for permanent attachment to the framework of the cutting mower, to thereby provide for a permanent connection of the tubular mount directly to the said mower framework, said tubular mount disposed for reception of the tubular portion of the accessory therein to provide for a removable attachment between the accessory and said bracket thereby providing for prompt installation, or removal, of the accessory to and from the cutting mower during operation, a pair of additional angles securing with the top of the angle means, said angle means having at least one slot provided therein and for accommodating fastening means for securement of the bracket to the structure of the framework, an integral slot provided intermediate the pair of additional angles, said integral slot furnishing clearance for cutting mower structure when the bracket is secured to its framework.

* * * * *